US012011836B2

(12) United States Patent
Kang et al.

(10) Patent No.: US 12,011,836 B2
(45) Date of Patent: Jun. 18, 2024

(54) CLOUD BASED COMPUTER-IMPLEMENTED SYSTEM AND METHOD FOR COMPUTER-ASSISTED PLANNING AND SIMULATION OF ROBOT MOTIONS IN CONSTRUCTION

(71) Applicant: SMART BUILDING TECH CO., LTD., Taipei (TW)

(72) Inventors: Shih-Chung Kang, Taipei (TW); Liang-Ting Tsai, Taipei (TW); Cheng-Hsuan Yang, Taipei (TW)

(73) Assignee: ROBIM TECHNOLOGIES INC. OF CANADA, Edmonton (CA)

( * ) Notice: Subject to any disclaimer, the term of this patent is extended or adjusted under 35 U.S.C. 154(b) by 333 days.

(21) Appl. No.: 17/218,685

(22) Filed: Mar. 31, 2021

(65) Prior Publication Data

US 2021/0316459 A1 Oct. 14, 2021

Related U.S. Application Data

(60) Provisional application No. 63/007,033, filed on Apr. 8, 2020, provisional application No. 63/007,026, filed
(Continued)

(51) Int. Cl.
*B25J 9/16* (2006.01)
*G06F 16/957* (2019.01)

(52) U.S. Cl.
CPC .............. *B25J 9/1671* (2013.01); *B25J 9/163* (2013.01); *B25J 9/1666* (2013.01); *B25J 9/1682* (2013.01);
(Continued)

(58) Field of Classification Search
CPC ........ B25J 9/1671; B25J 9/163; B25J 9/1666; B25J 9/1682; B25J 9/1687; B25J 9/1689; G06F 16/9577
See application file for complete search history.

(56) References Cited

U.S. PATENT DOCUMENTS

2007/0135933 A1* 6/2007 Panesse ................. B25J 9/1671
700/17
2016/0263767 A1* 9/2016 Williams ................ B27F 7/003
(Continued)

FOREIGN PATENT DOCUMENTS

CN        108582068 B  *  7/2021    ............ B25J 9/1605

OTHER PUBLICATIONS

Sven, Stumm, Peter Neu and Sigrid Brell-Cokcan, "Towards Cloud Informed Robotics", pp. 59-64 (2017 Proceedings of the 34rd ISARC, Taipei, Taiwan, ISBN 978-80-263-1371-7, ISSN 2413-5844) (Year: 2017).*

*Primary Examiner* — Adam R Mott
*Assistant Examiner* — Alyzia N Dilworth
(74) *Attorney, Agent, or Firm* — Demian K. Jackson; Jackson IPG PLLC

(57) ABSTRACT

The present invention relates to a computer-implemented system. The system includes: an internet capable device installed with a web browser to enable web browsing to access an internet; and a cloud computing server system available on the internet and configured to: cause a visualization interface to be displayed on the web browser; receive a user instruction corresponding to a user interaction with the visualization interface inputted through the web browser; import an extracted building information modelling data from external; plan and simulate a robot motion path and a sequence of motions partly based on the extracted building information modelling data by selectively performing intelligent algorithms according to the user instruction; and generate a predetermined motion command set including the determined robot motion path and sequence of motions for a robotic device to move accordingly to prefabricate a plurality of construction components.

5 Claims, 13 Drawing Sheets

Related U.S. Application Data on Apr. 8, 2020, provisional application No. 63/007,128, filed on Apr. 8, 2020.

(52) U.S. Cl.
CPC ........... *B25J 9/1687* (2013.01); *B25J 9/1689* (2013.01); *G06F 16/9577* (2019.01)

(56) References Cited

U.S. PATENT DOCUMENTS

| | | | |
|---|---|---|---|
| 2020/0061821 A1* | 2/2020 | Linnell | B25J 9/1664 |
| 2020/0134745 A1* | 4/2020 | McLinden | G06Q 10/06313 |

* cited by examiner

| Hardware in Library | |
|---|---|
| Robot Arm | 425 |
| End Effector | 427 |
| Working Table | 429 |
| Material Machine | 431 |
| Component layout | 433 |
| Grip Object | 435 |
| Models | 437 |
| Mesh Object | 439 |
| Positioner | 441 |
| Start Transform | 443 |

423

CLOUD BASED COMPUTER-IMPLEMENTED SYSTEM AND METHOD FOR COMPUTER-ASSISTED PLANNING AND SIMULATION OF ROBOT MOTIONS IN CONSTRUCTION

CROSS-REFERENCE TO RELATED APPLICATION

This application is based upon and claims the benefits of priorities to U.S. Provisional Application No. 63/007,033, filed on Apr. 8, 2020, U.S. Provisional Application No. 63/007,128, filed on Apr. 8, 2020, U.S. Provisional Application No. 63/007,026, filed on Apr. 8, 2020, the entire disclosures of which are incorporated herein by reference.

COPYRIGHT NOTICE

A portion of the disclosure including at least descriptions, embodiments, claims, and drawings of this patent document contains materials that are subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD

The present invention relates to a cloud based computer-implemented system and method for computer-assisted planning and simulation of robot motions in construction, in particular to a cloud based computer-implemented system and method equipped with a built-in physics engine to plan, simulate, and rehearse robot motions performing a component prefabrication task in an off-site robotic semi-automation construction.

BACKGROUND

Robotic automation process in building construction is an emerging technology and involves the use of one or more robotic devices that are applied to construct the building or essential components composing the building, such as a floor panel, a wall panel, a door panel, a window panel, or any other components, in a fully automatic or semi-automatic way.

The robotic devices are usually equipped with end effector to mount and connect tools, such as a gripper or a drill, that is used during the constructing process. The robotic devices are pre-programmed with sequences of specific motion commands and commands for other operations in order to cause the robotic devices to complete the constructing process.

The robotic automation construction is suitable for constructing unique structures with features of high complexity, high-mix, and low-volume, and is proved with high degrees of versatility, diversity and flexibility to perform construction works. Through the decades of development, currently there are two major robotic automation construction methods available, the on-site robotic construction scheme, and the off-site robotic construction scheme.

However, the issue is the preparation of numerous parameters, actions, motions and paths of the robotic devices to carry out the robotic construction process is a huge project and highly complicated and sophisticated, which is required to be scheduled, planned, validated, and rehearsed repetitively for many times, prior to the commencement of the constructing process, and impossible to be done by using actual robotic devices.

Hence, there is a substantive need to develop and design a professional virtual reality robot planner and simulator particularly applicable for simulating the robotic automation construction process to solve the above issues/deficiencies.

SUMMARY

In view of the state of the art, the present invention provides a cloud based computer-implemented system and method for computer-assisted planning and simulation of robot motions in construction, in particular a cloud based computer-implemented system and method equipped with a built-in physics engine to plan, simulate, and rehearse robot motions performing a component prefabrication task in an off-site robotic semi-automation construction.

Accordingly, the present invention provides a computer-implemented system which includes an internet capable device installed with a web browser to enable web browsing to access an internet; and a cloud computing server system available on the internet and configured to: cause a visualization interface to be displayed on the web browser; receive a user instruction corresponding to a user interaction with the visualization interface inputted through the web browser; import an extracted building information modelling data from external; plan and simulate a robot motion path and a sequence of motions partly based on the extracted building information modelling data by selectively performing intelligent algorithms according to the user instruction; and generate a predetermined motion command set including the determined robot motion path and sequence of motions for a robotic device to move accordingly to prefabricate a plurality of construction components.

The present invention further provides a computer-implemented method which includes causing a visualization interface to be displayed on the web browser; receiving a user instruction corresponding to a user interaction with the visualization interface inputted through the web browser; extracting a building information modelling data externally; importing the extracted building information modelling data from external; planning and simulating a robot motion path and a sequence of motions partly based on the extracted building information modelling data by selectively performing intelligent algorithms according to the user instruction; and generating a predetermined motion command set including the determined robot motion path and sequence of motions for a robotic device to move accordingly to prefabricate a plurality of construction components.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1:
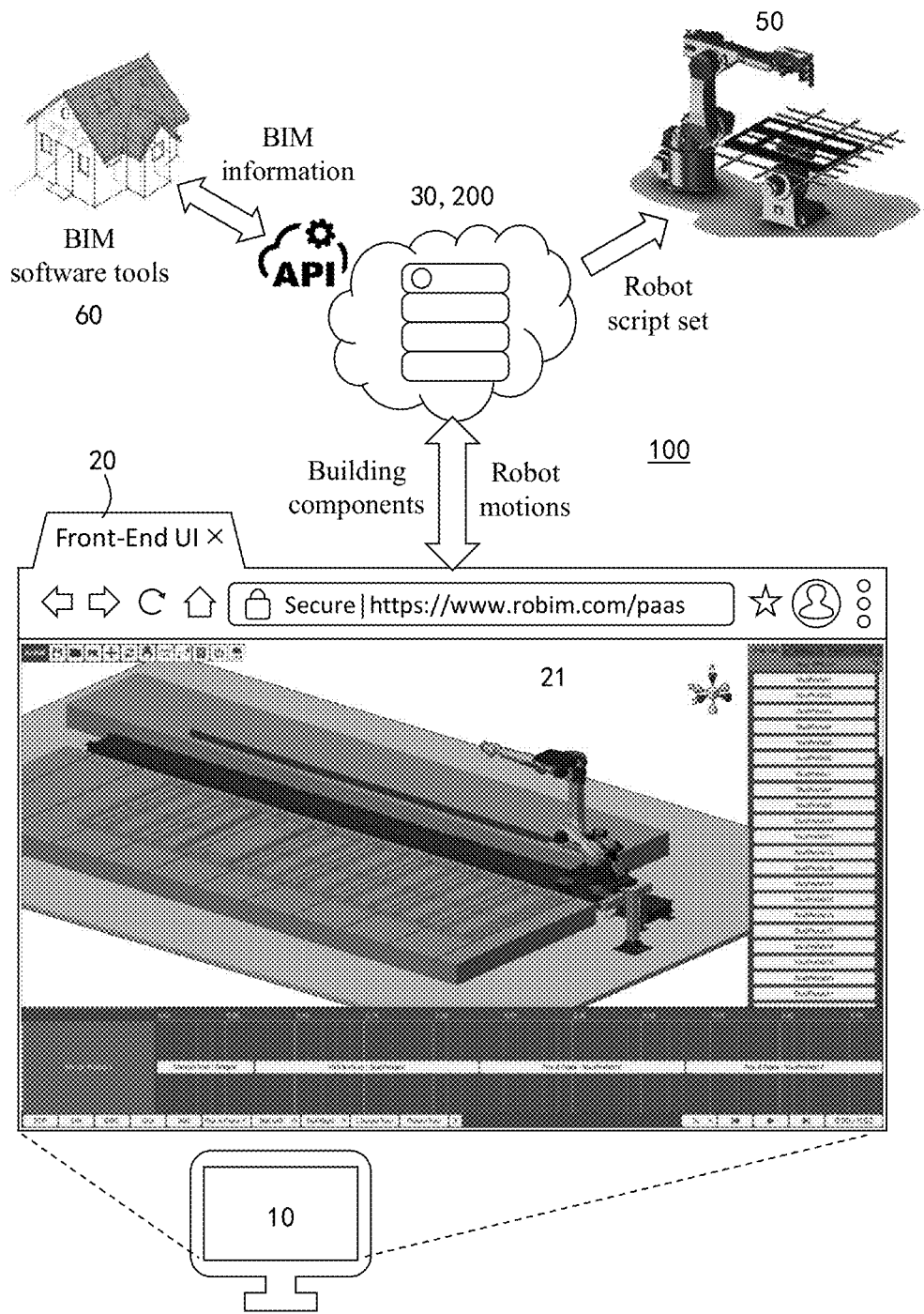
FIG. 1 is a schematic diagram illustrating a conceptual modelling for a cloud based computer-implemented system according to a first example embodiment of the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

Terms

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

In this disclosure, the terms "robot", "robots", "robotic device", "robotic devices" and the like refer to any automatically operated mechanical machine which is programmed to perform a wide variety of functions, operations, duties or tasks automatically, may not resemble human beings in appearance or perform in a humanlike manner, and have different scalable formation varied from a lightweight manufacturing robots to a heavy-load or heavy-duty assembly robots. In certain embodiments of the disclosure, the robot is preferably an industrial robot or a multi-axis robot arm, and may be regarded as a robot builder.

The term "building" means any form of building, such as a house, a wooden house, a reinforced concrete building, a steel building, a steel-reinforced concrete building, a residential complex, an apartment complex, a condominium, a dwelling unit, or a skyscraper, which is built by implementing civil engineering means or civil engineering based construction works.

The term "construction base" and "building foundation" refers to a site, a place, an area, a location, a spot, a position, a base or a venue on which a building is under construction. The term "construction site" refers to a site, a place, an area, a location, a spot, a position, a base or a venue where construction works are carried out.

The terms "near-site position", "near site" and the like mean a site, a place, an area, a location, a spot, a position, a base or a venue situated near, in a close proximity to, close to, or next to the construction site, the construction base, or the building foundation preferably less than 50 meters, 100 meters, 150 meters, 30 meters or 500 meters, as well as the terms "near-site position", "near site" and the like mean a site, a place, an area, a location, a spot, a position, a base or a venue situated within a periphery or a periphery area around the construction site and has a diameter preferably less than 50 meters, 100 meters, 150 meters, 30 meters or 500 meters.

The terms "work cell" and "scene" refer to a cluster of robotic devices, equipment, and materials that are required for the robotic device to carry out the fabrication task, in particular a construction component prefabrication task. The configuration of the work cell is highly in association with the productivity and costs. The user is able to try different combinations of work parameters, and change different robotic device to test and find out and a better configuration. In this disclosure, the work cell is equivalent to and also known as the scene.

System Overview

FIG. 1 is a schematic diagram illustrating a conceptual modelling for a cloud based computer-implemented system according to a first example embodiment of the present invention. FIG. 1 demonstrates an example computer-implemented system 100 that preferably includes at least internet capable device 10 and a cloud computing server system 30. The cloud computing server system 30 may be a cluster of cloud-based computing servers and provides cloud-based centralized computing power, in contrast to the edge or distributed computing power executed on the separated individual nodes, such as the internet capable device 10.

The internet capable device 10 has the internet capability, is preferably a web-enabled user equipment, equipped with appropriate internet connectivity, such as Wi-Fi, Bluetooth, 4G 5G, 6G, or Sub-1G, and installed with a web browser 20 to enable web browsing to access internet. The example internet capable device 10 preferably is, such as mobile internet device (MID), portable internet device, desktop computer, notebook computer, tablet device, game console, smart glass, or mobile phone device.

A computer-assisted cloud based robotic construction software platform 200 (hereinafter referred to as the platform for short) is established based on the software as a service (SAAS) technology and the platform as a service (PAAS) technology and a backend cross-platform software. The platform 200 is originally installed and functions on the cloud computing server system 30, addressed on the internet by specifying a uniform resource locator (URL), and thus available to users or subscribers over the internet. Any user is able to access, use, and operate the platform 200 easily by connecting to the internet by one's own internet capable device 10, opening the web browser 20 on the internet capable device 10 and entering the URL directing into the web browser 20.

The platform 200 is configured to generate various visualization interfaces 21 acting as frontend user interfaces in the web browser 20 running on the internet capable device 10. The platform 200 is configured to receive user operations corresponding to interactions with visualization interfaces 21 shown in the web browser 20 from one's own internet capable device 10 as instructions to execute correspondingly and accordingly.

In response to the received user operations, the platform 200 is capable of executing a variety of built-in modules that enable various assistances in all aspects of coordinating, sequencing, scheduling, planning, and simulating robotic motions or paths of one or more robotic devices, for any users to coordinate, sequence, schedule, plan, design, simulate, re-sequence, re-schedule, re-plan, re-design robotic motions or paths for one robot or among more robotic devices. The platform 200 is configured to conclude the determined robotic motions as a predetermined motion command set or a robot script set and output and transmit the set to the respective controllers of the corresponding actual robotic devices 50. The platform 200 further includes a couple of externally-operated modules in a form of add-ins module cooperated with and functions within the building information modelling (BIM) software tools 60, such as AUTODESK REVIT, SketchUp, GRAPHISOFT ARCHICAD, etc., for any users to operate.

Preferably, the robot or robotic devices are industrial-use multi-axis robotic devices and used in construction process, such as semi-automated construction, automated construction, or near-site construction, to perform a physical fabrication task, in particular, a construction component prefabrication task. The construction process may involve the use of one or more robotic devices that may be used to construct a variety of components of a building. The robotic devices may be equipped with end-effector-mounted tools, such as a gripper or a drill, that may be used during construction process. The actual robotic devices are configured and controlled to act according to the predetermined motion command set including sequences or paths of specific motions sent from the respective controllers to complete the specified task.

Platform

The platform 200 is preferably a no-code robotic motion simulation software or a robot simulator, and the generated visualization interfaces in the web browser 20 may provide multiple visualization-based functions and various easy-to-use robotic programming tools. The platform 200 provides a simulation to real (sim-to-real) virtual physical environment with built-in physics engine that enables virtual robot objects to simulate or approximate universal forces existing in the real world, such as gravity, velocity, acceleration, friction, etc., for any users with different level of computer skills distributed from ordinary people, such as subscribers or contractors, to professionals, such as programmers, designers or engineers, to simulate robotic motions or paths without writing a single line of code.

The platform 200 is designed and established subject to a work cell-oriented or a scene-oriented architecture, and a series of visualization interfaces are provided through the web browser for any user to access and operate the platform 200. Four edges including the left-hand and right-hand sides and the upper and lower parts of the respective visualization interfaces are preferably arranged and configured to embed with a variety of functional sidebars, toolbars or operating panels. The most and central part within the respective visualization interfaces is configured to provide a central display window virtually showing an animated simulation for the robotic devices and the work cell.

Modules and Components

Figure 2:
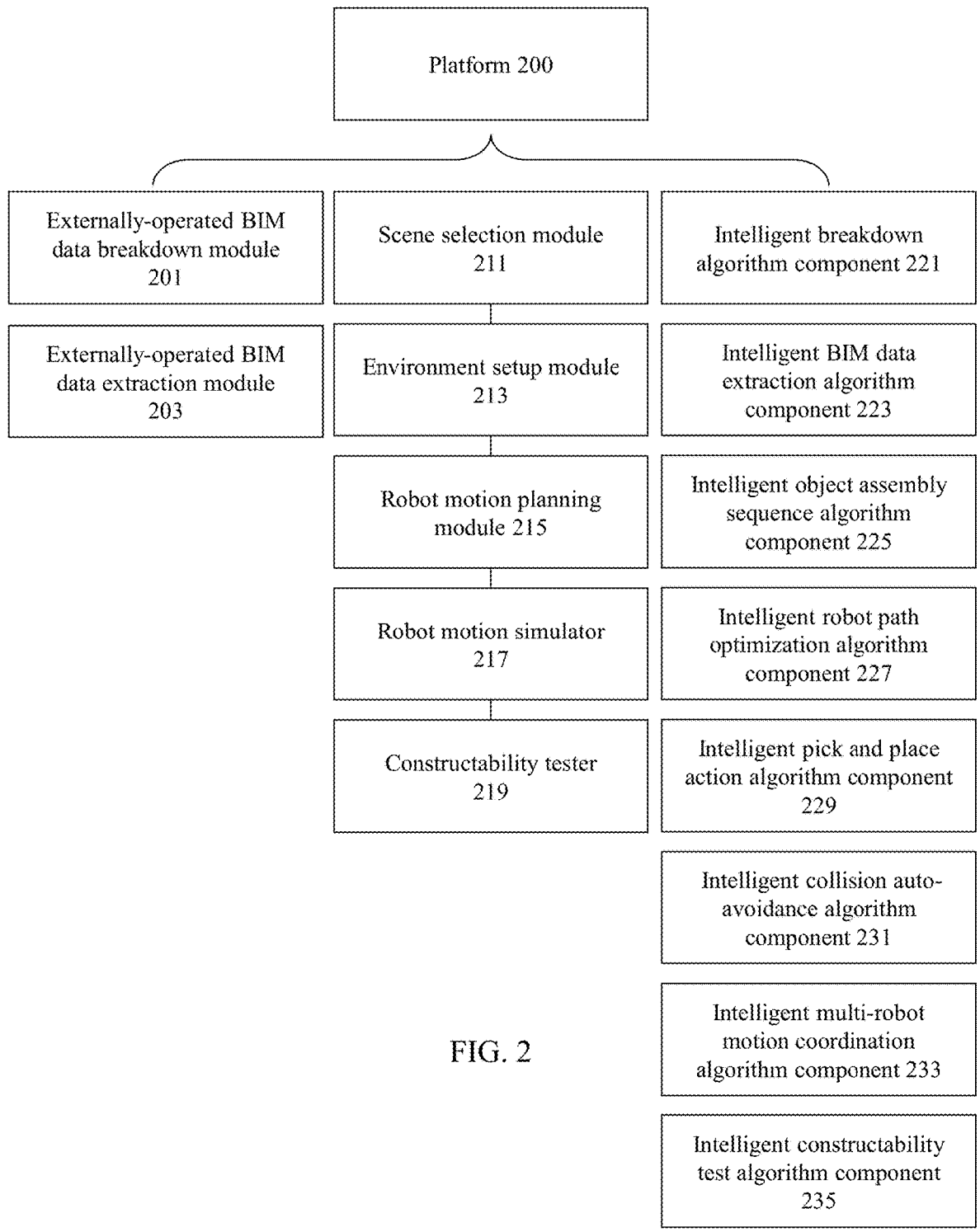
FIG. 2 is a structural diagram illustrating basic models and components for the implementation of the computer-assisted cloud based robotic construction software platform in accordance with the present invention.

FIG. 2 is a structural diagram illustrating basic models and components for the implementation of the computer-assisted cloud based robotic construction software platform in accordance with the present invention. In one embodiment, the platform 200 consists of a number of the externally-operated modules, the built-in modules, the units and the intelligent algorithm components which are represented and provided by the visualization interface for any users to operate, to enable a variety of specific-purpose functions in response to user instructions from operations.

The modules and algorithm components are selected from one of an externally-operated BIM data breakdown module 201, an externally-operated BIM data extraction module 203, a scene selection module 211, an environment setup module 213, a robot motion planning module 215, a robot motion simulator 217, a constructability tester 219, an intelligent breakdown algorithm component 221, an intelligent BIM data extraction algorithm component 223, an intelligent object assembly sequence algorithm component 225, an intelligent robot path optimization algorithm component 227, an intelligent pick and place action algorithm component 229, an intelligent collision auto-avoidance algorithm component 231, an intelligent multi-robot motion coordination algorithm component 233, and an intelligent constructability test algorithm component 235.

BIM Data Breakdown Module

Figure 3:
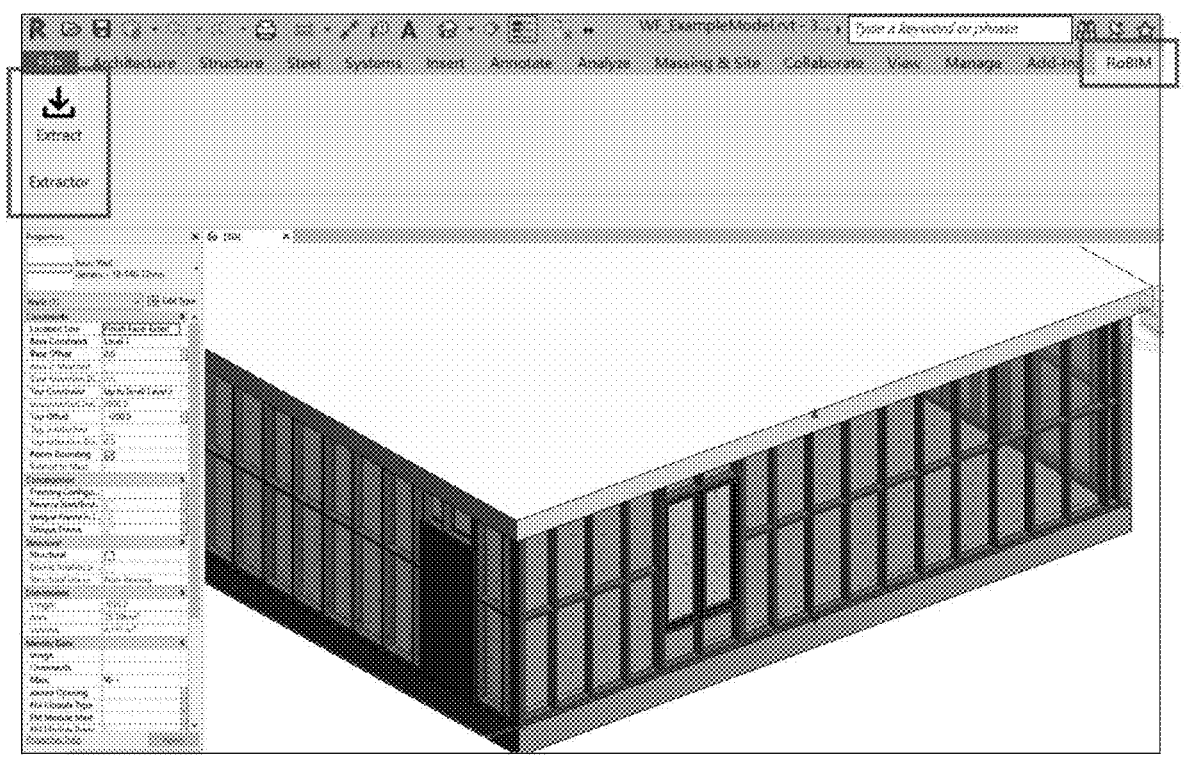
FIG. 3 is a schematic diagram illustrating a visualization interface that provides an externally-operated BIM data breakdown module that is configured in a form of add-ins and cooperated with and functions within a BIM software according to the present invention.

FIG. 3 is a schematic diagram illustrating a visualization interface that provides an externally-operated BIM data breakdown module that is configured in a form of add-ins and cooperated with and functions within a BIM software according to the present invention. The externally-operated BIM data breakdown module is preferably configured in a form of such as an add-ins or a plug-in that is cooperated with and functions within a BIM software, to add a specific feature to the BIM software. The BIM software is preferably selected from one of AUTODESK REVIT, SketchUp, GRAPHISOFT ARCHICAD, etc. The externally-operated BIM data breakdown module is established in compliance with a particular officially-released API protocols.

For example, the externally-operated BIM data breakdown module is an add-ins module, established, for example, according to the REVIT API protocol, and provides the BIM data breakdown visualization interface 301 within the BIM software, as show in FIG. 3. The BIM data breakdown visualization interface 301 provides for a user to operate to import and graphically view BIM dataset in 3D, and further includes multiple quick menus and quick buttons for the user to manually operate to perform a breakdown operation to break down a BIM model into a variety of components of a building, such as a floor panel, a door panel, a wall panel, etc., and to further break down each component into basic members composing the component. The externally-operated BIM data breakdown module may selectively call and execute intelligent breakdown algorithm component to automatically perform the breakdown operation, in response to a user's operation within the visualization interface 301.

BIM Data Extraction Module

Figure 4:
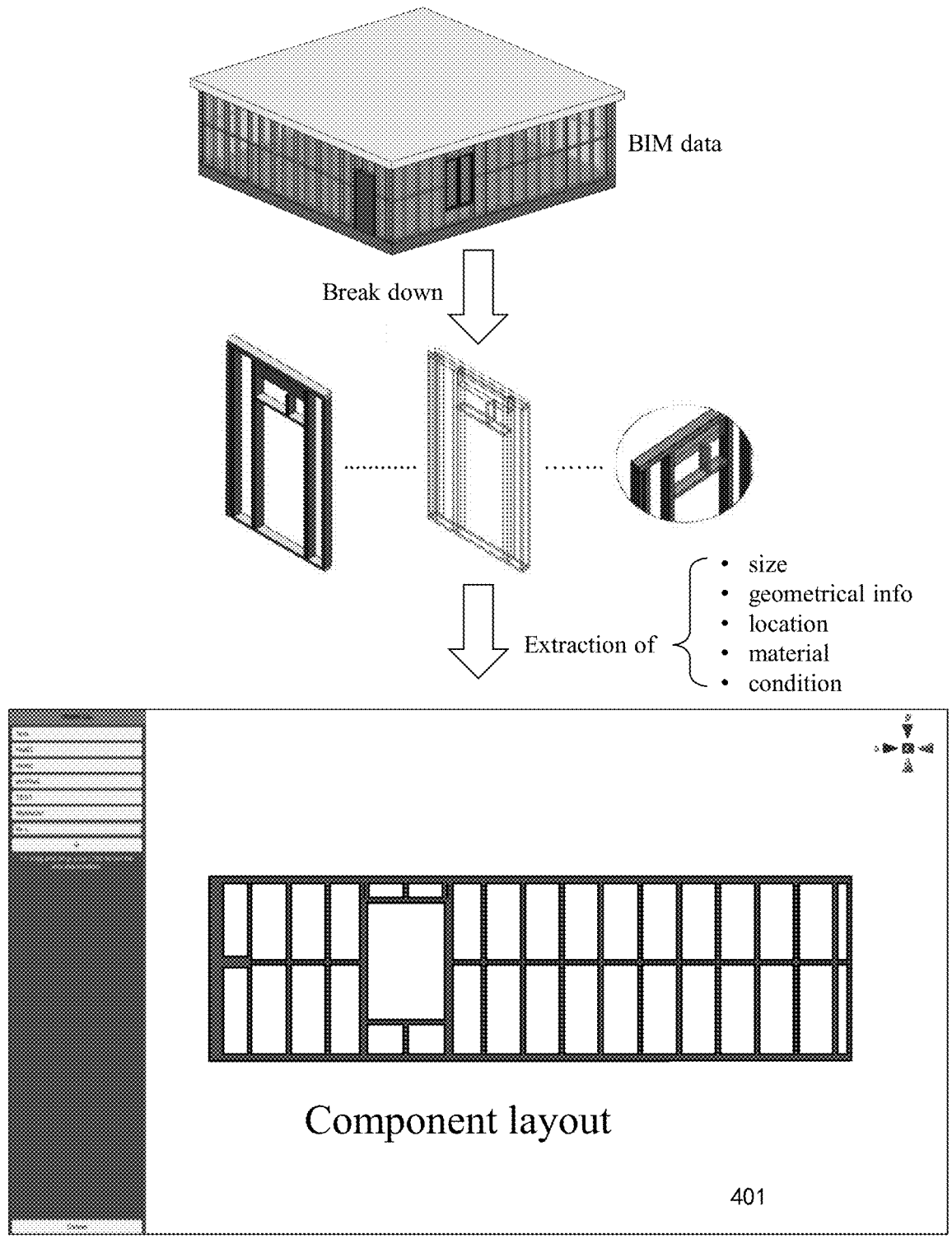
FIG. 4 is a schematic diagram illustrating a process of BIM data extraction according to the present invention.

FIG. 4 is a schematic diagram illustrating a process of BIM data extraction according to the present invention. The externally-operated BIM data breakdown module further include an intelligent BIM data extraction algorithm component that is configured to extract the construction information from BIM dataset, including at least a geometric information, a size, a location, a material, a schedule, a condition, etc., in response to a user's operation in the visualization interface. The BIM data extraction component is configured to access BIM files written in compliance with standard IFC (Industry Foundation Classes) format and identify and extract information by analyzing IFC schema protocol. The extracted BIM information is the input data fed to the platform 200.

In alternative, the BIM data extraction component is selectively built as an independent externally-operated BIM data extraction module that is preferably configured in a form of an add-ins that is cooperated with and functions within a BIM software as well. The independent externally-operated BIM data extraction module provides quick menus and quick buttons for a user to operate to extract and acquire the required construction information. Preferably, the desired results are represented in a form of a component layout in the component layout visualization interface 401 of a component layout option from a hardware in library sidebar provided in an environment setup module, as shown in FIG. 4.

Scene Selection Module

Figure 5:
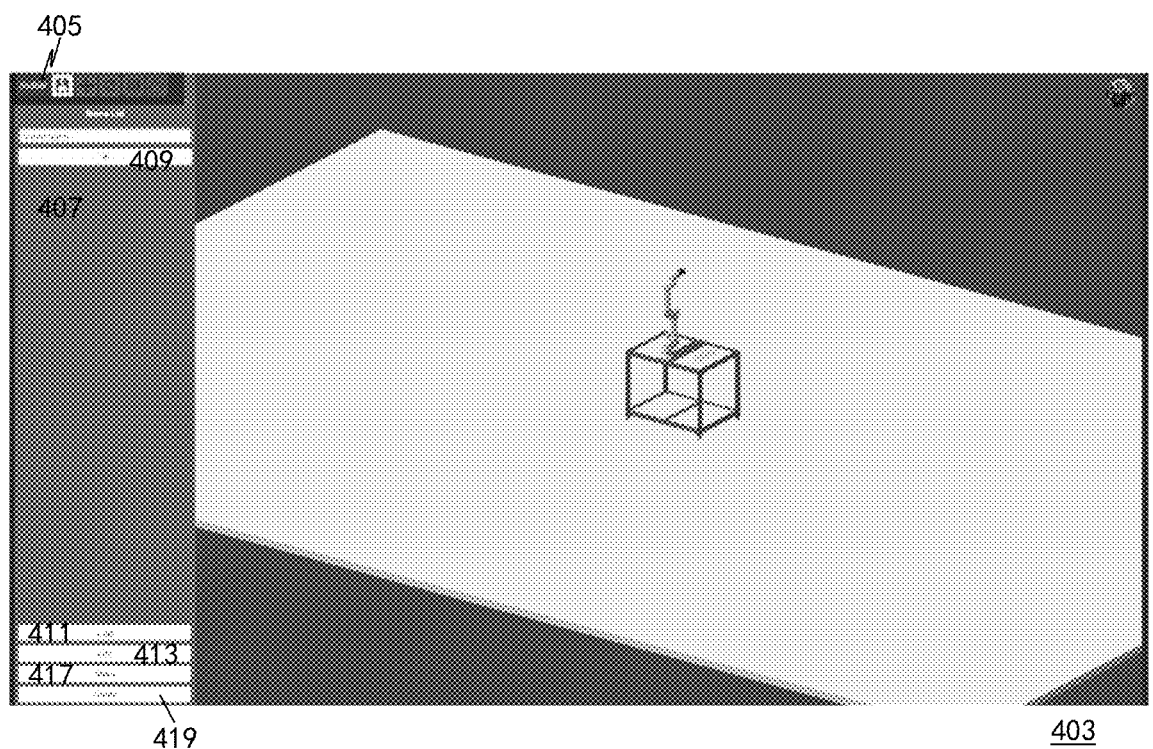
FIG. 5 is a schematic diagram illustrating an example main administrative visualization interface provided by a scene selection module in accordance with the present invention.

FIG. 5 is a schematic diagram illustrating an example main administrative visualization interface provided by a scene selection module in accordance with the present invention. Whenever a user logs in the platform 200, a scene selection module is enabled and a main administrative visualization interface 403 is initially displayed on the user's internet capable device 10 through the web browser 20.

An admin sidebar 405 is embedded and represented, for example at the left-hand side, within the main administrative visualization interface 403. The admin sidebar 405 lists the currently available scenes that were previously created by user in the scene list block 407 and is configured to provide an add button 409 to open a new scene, a load button 411 to select and load saved scenes, an edit button 413 to enable edition of the loaded scene, a share button 415 to share scenes, and a delete button 417 to delete scenes, for a user to process. Whenever a user clicks the add button that is represented by a plus symbol in the admin sidebar 405 to open a new scene, an environment setup visualization interface will be displayed in the web browser, for a user to edit work parameters in the newly-opened scene.

Environment Setup Module

Figure 6:
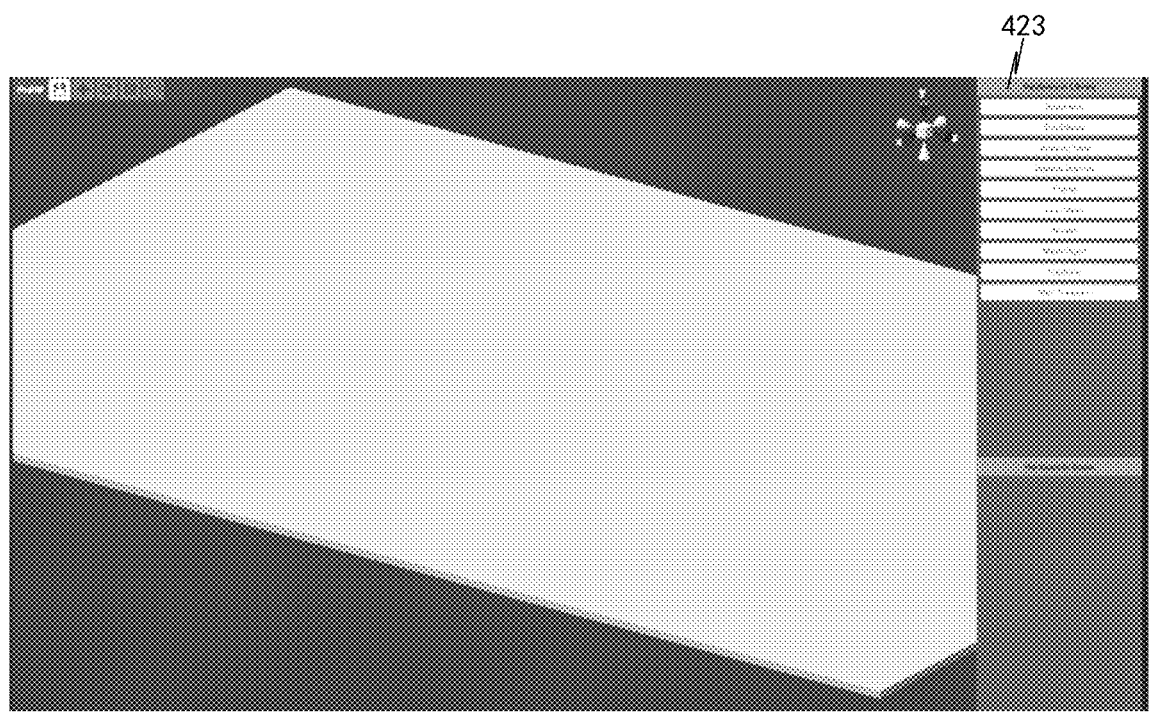
FIG. 6 is a schematic diagram illustrating an example environment setup visualization interface containing a management toolbar and a hardware in library sidebar provided by an environment setup module in accordance with the present invention.

FIG. 6 is a schematic diagram illustrating an example environment setup visualization interface containing a management toolbar and a hardware in library sidebar provided by an environment setup module in accordance with the present invention. In an environment setup module, an environment setup visualization interface 421 is provided through the web browser which the interface allows a user to create, configure and initialize a new work cell, containing one or more robotic devices, or a new scene for the robotic devices to perform a fabrication task, prior to commence the simulation of a manufacturing process using the robotic devices in the actual reality.

In particular, a hardware in library sidebar 423 is embedded and represented, for example at the right-hand side, within the environment setup visualization interface 421, allowing a user to select and configure different work parameters describing robotic devices, assigning attributes of robotic devices, defining other aspects of a work cell and calibrating the robotic devices. A management toolbar is embedded and represented, for example at the upper part, within the environment setup visualization interface 421, allowing a user to select and activate the file management related functions.

Figures 7, 8:
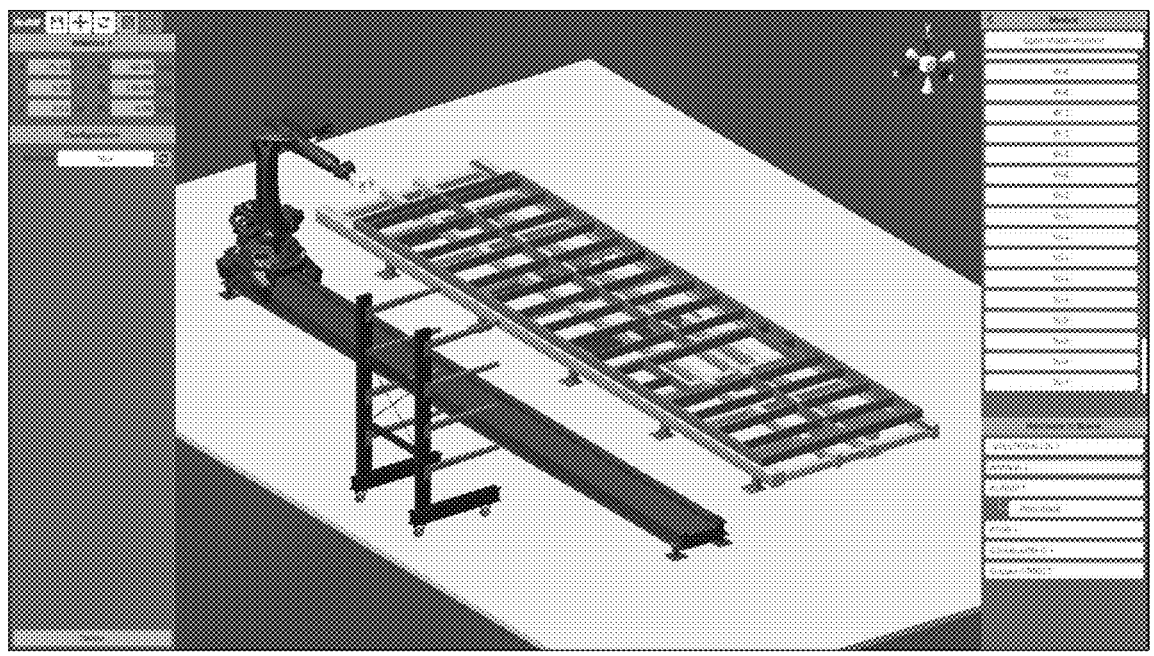
FIG. 7 is a schematic diagram illustrating a top layer of abstraction menu provided in the hardware in library sidebar provided in accordance with the present invention.
FIG. 8 is a schematic diagram illustrating an example frame component layout that is imported from the previously extracted BIM information loaded by a user and displayed within an example environment setup visualization interface according to the present invention.

FIG. 7 is a schematic diagram illustrating a top layer of abstraction menu provided in the hardware in library sidebar provided in accordance with the present invention. Additionally, the hardware in library sidebar 423 may preferably provide a top layer of abstraction menu to show these work parameters in captions including at least a robot arm option 425 to select a robot model to work, an end effector option 427 to select an end effector to work, a working table option 429 to configure a workbench, a material machine option 431 to set up a material feeder, a component layout option 433 to select a frame layout, a grip object option 435, a models option 437 to select a BIM model, a mesh object option 439, a positioner option 441 to calibrate the robotic devices, and a start transform option 443, so that users may input, set up, and configure these work parameters to arrange all of the resources without having to specify particular robot commands or type a single line of code and without actually actuating the robotic devices.

FIG. 8 is a schematic diagram illustrating an example frame component layout that is imported from the previously extracted BIM information loaded by a user and displayed within an example environment setup visualization interface according to the present invention. In order to complete the environment setup for creating a new scene from scratch, the previously extracted BIM information including the component layout information should be imported into the environment setup module and displayed in a component layout visualization interface 401, by the user operation to click the component layout option 433 in the hardware in library sidebar 423 and then the file button in the management toolbar.

Robot Motion Planning Module

Figure 9A:
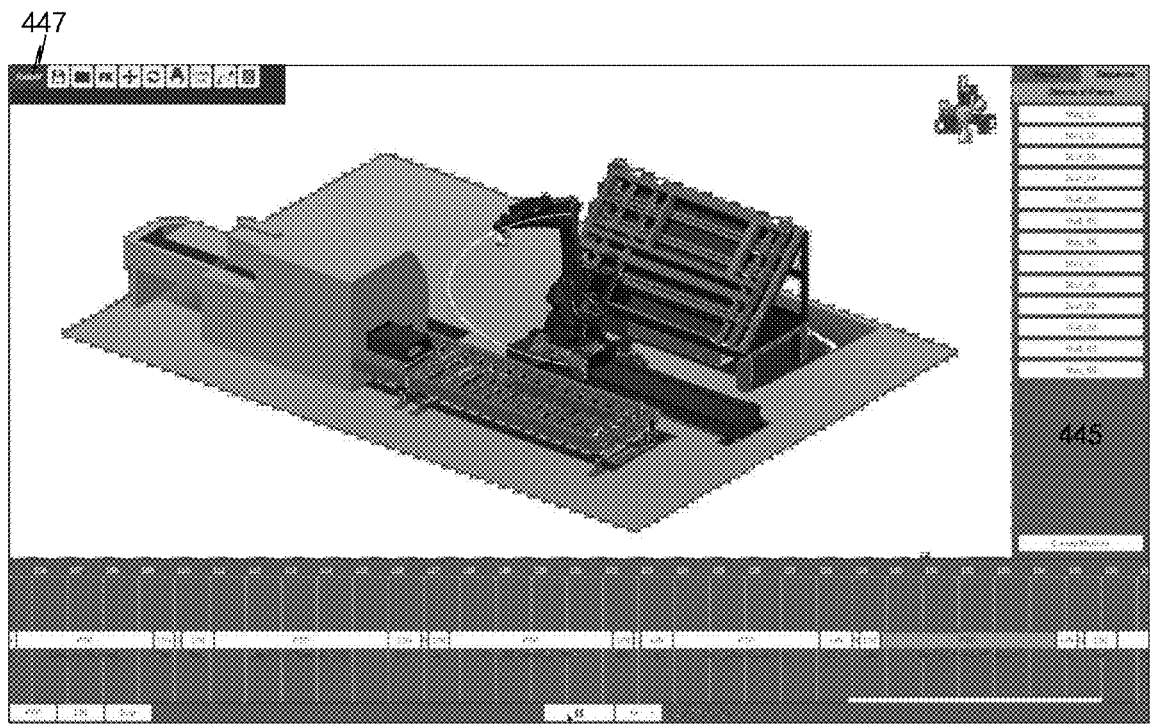
FIG. 9A and FIG. 9B are schematic diagrams illustrating example robot motion scheduling visualization interfaces provided by a robot motion planning module in accordance with the present invention.
Figure 9B:
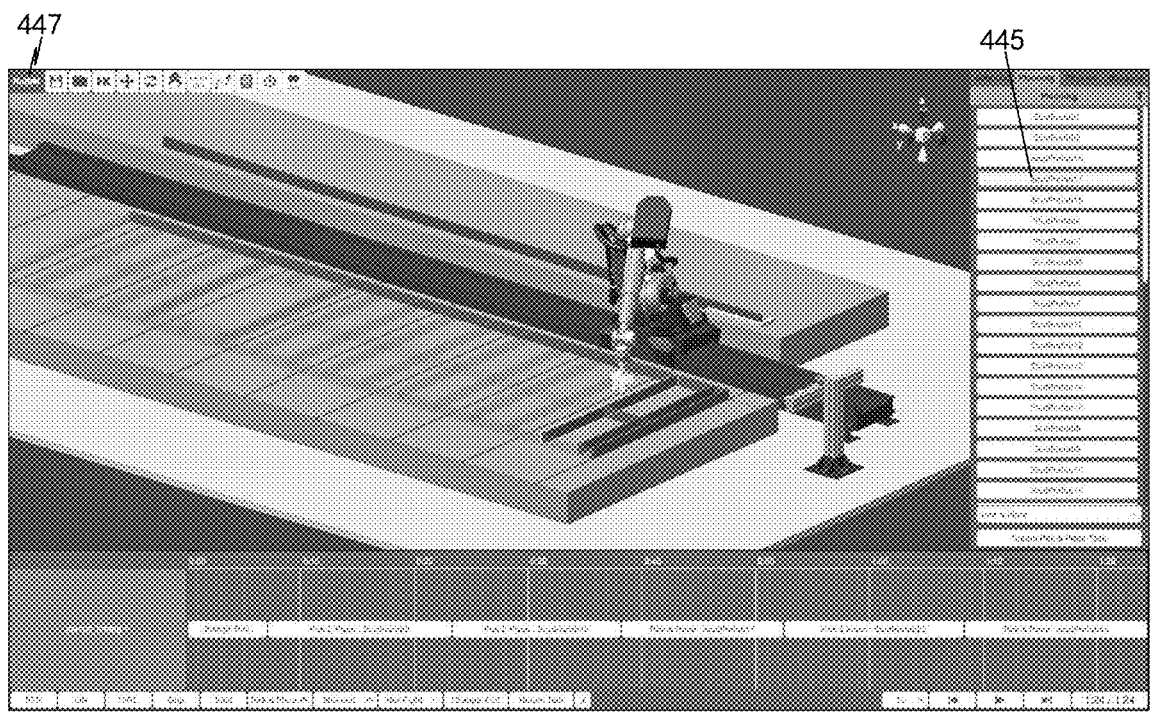

FIG. 9A and FIG. 9B are schematic diagrams illustrating example robot motion scheduling visualization interfaces provided by a robot motion planning module in accordance with the present invention. Once the work cell is configured and the component layout is imported and loaded, a robot motion planning module may then be activated and used in determining a sequence of robot motion including at least a sequence of joint angles and/or joint movements that cause a robotic device to follow a particular motion path.

In the robot motion planning module, an object sequence panel 445 is embedded and represented, for example at the right-hand side, and a robot control toolbar 447 is embedded and represented, for example at the top side, within the robot motion scheduling visualization interface 449, in which all virtual displayed contents including the robotic device and the configurations and objects in the work cell are viewed with a particular adjustable camera angle. All the respective basic members, for example, a bunch of wood studs, composing a particular construction component, are represented by blocks, each of which blocks are assigned with a particular number respectively in the object sequence panel 445.

A sequence of blocks from top to bottom indicates a sequence of basic members to assemble, so that the user is able to manually arrange the sequence of basic members to assemble by straightforwardly adjusting and arranging a sequence of the blocks. In alternative, the robot motion planning module may selectively call and execute an intelligent object assembly sequence algorithm component that is a rule-based algorithm and capable of automatically sorting a sequence among the basic members to assemble the construction component, in response to a user's operation in the visualization interface 449.

Figure 10:
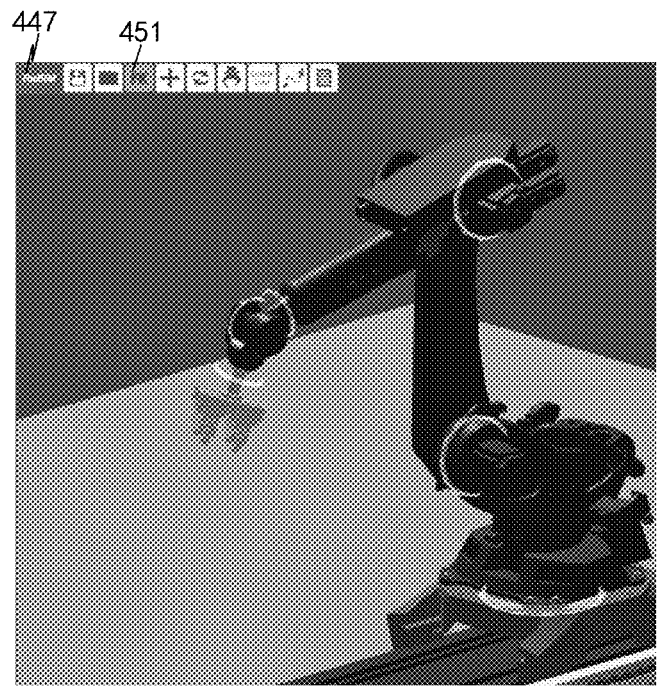
FIG. 10 is a schematic diagram illustrating an implementation of a FK mode and a FK mode toggle included and shown within the robot control toolbar in accordance with the present invention.

FIG. 10 is a schematic diagram illustrating an implementation of a FK mode and a FK mode toggle included and shown within the robot control toolbar in accordance with the present invention. The robot control toolbar may further provide a variety of toggles for a user to configure all details for robotic motions in the robot motion simulator. For instance, The FK mode refers to compute the position and orientation of the tool frame relative to the base frame or the end effector based on the kinematic equations of a robot by a set of given joint parameters including angles and positions. A forward kinematic (FK) mode is enabled in the robot motion simulator, such that the robotic device reaches the target object by solving FK mathematical problem, whenever the FK mode toggle 451 within the robot control toolbar 447 is clicked.

Figure 11:
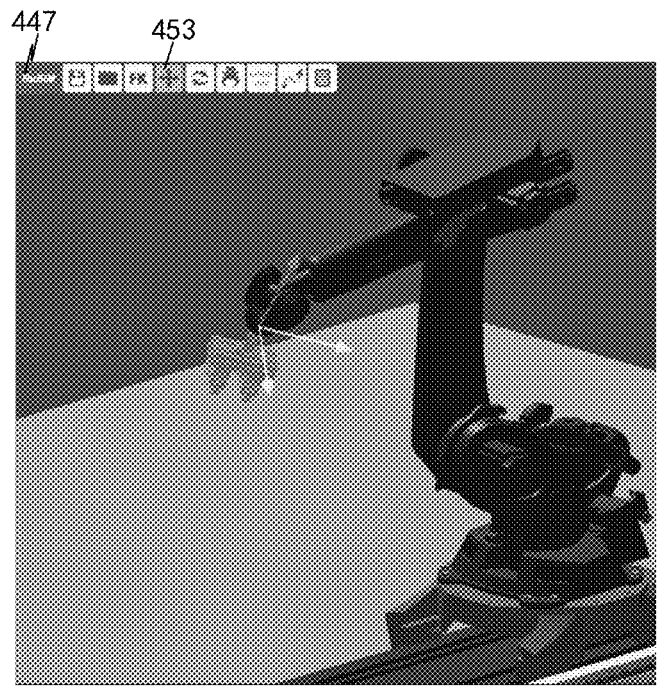
FIG. 11 is a schematic diagram illustrating an implementation of a IK-linear mode and a IK-linear mode toggle included and shown within the robot control toolbar in accordance with the present invention.
Figure 12:
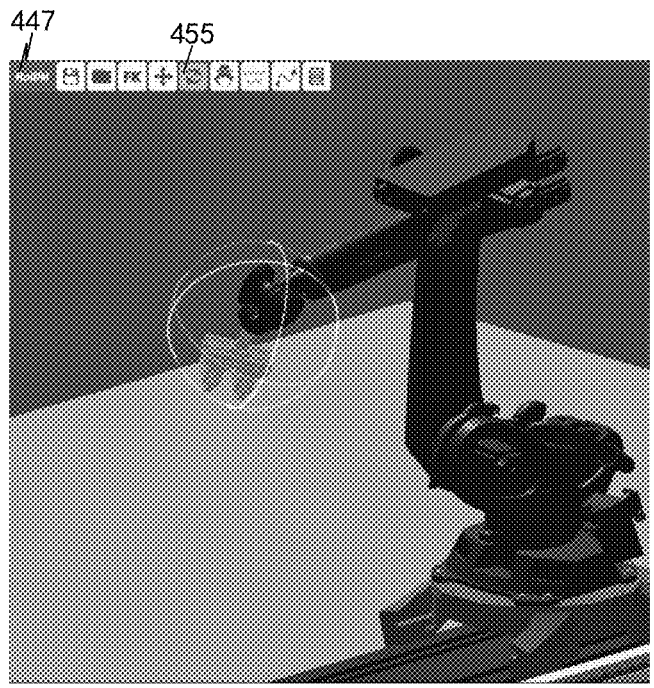
FIG. 12 is a schematic diagram illustrating an implementation of a IK-rotation mode and a IK-rotation mode toggle included and shown within the robot control toolbar in accordance with the present invention.

FIG. 11 is a schematic diagram illustrating an implementation of a IK-linear mode and a IK-linear mode toggle included and shown within the robot control toolbar in accordance with the present invention. FIG. 12 is a schematic diagram illustrating an implementation of a IK-rotation mode and a IK-rotation mode toggle included and shown within the robot control toolbar in accordance with the present invention. In contrast to the FK mode, the IK mode refer to compute all possible sets of the joint parameters that could be used to attain this given position and orientation by a given position and orientation of the end effector. Either a linear inverse kinematic (IK) mode or a rotational IK mode is enabled in the robot motion simulator, such that the robotic device reaches the target object by solving IK mathematical problem, whenever either the IK-linear mode toggle 453 or the IK-rotation mode toggle 455 within the robot control toolbar 447 is clicked.

Figure 13:
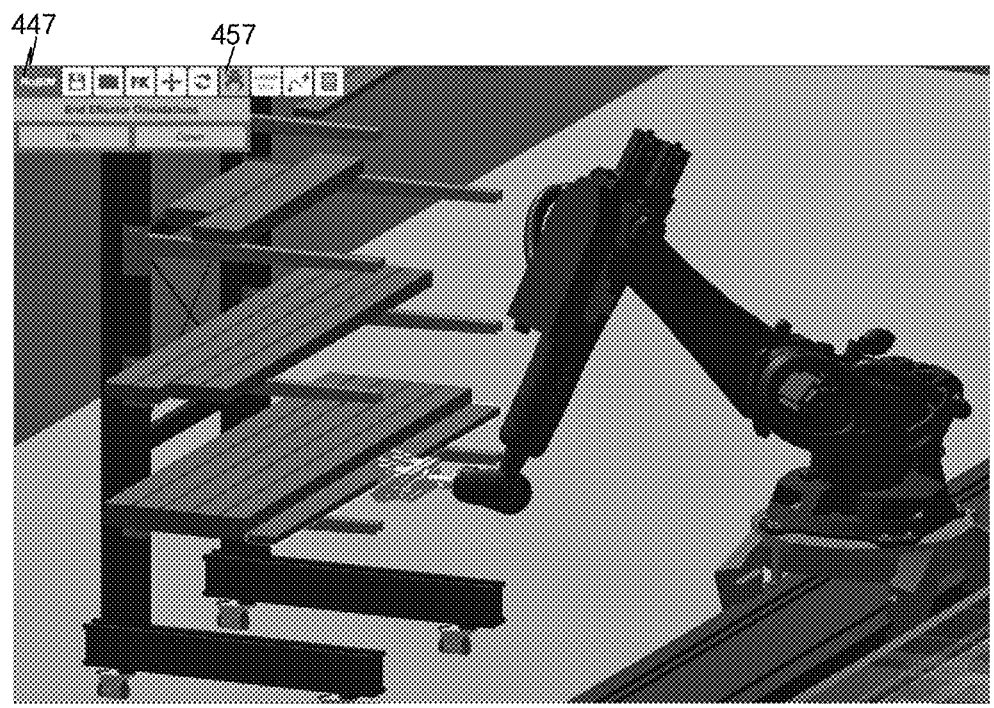
FIG. 13 is a schematic diagram illustrating an implementation of an end effector orientation and an end effector orientation toggle included and shown within the robot control toolbar in accordance with the present invention.

FIG. 13 is a schematic diagram illustrating an implementation of an end effector orientation and an end effector orientation toggle included and shown within the robot control toolbar in accordance with the present invention. The direction of end effector is set up in the robot motion simulator whenever the end effector orientation toggle 457 within the robot control toolbar 447 is clicked. There are at least two directions, including up and down directions, available for a user to select to set up direction for the end effector.

Figure 14:
FIG. 14 is a schematic diagram illustrating a detailed info table and an info button to access the detailed info table for current motion included and shown within the robot control toolbar in accordance with the present invention.

FIG. 14 is a schematic diagram illustrating a detailed info table and an info button to access the detailed info table for current motion included and shown within the robot control toolbar in accordance with the present invention. Whenever the info button 459 in the robot control toolbar 447 is clicked, a detailed info table 461 is popped up to the top of the robot motion scheduling visualization interface 449. The detailed info table 461 contains and shows every details for the robotic device, for example, the angles of the six joints of a robot arm, and the position and rotation of the end effector of the robot arm in the robot info sheet.

Figure 15:
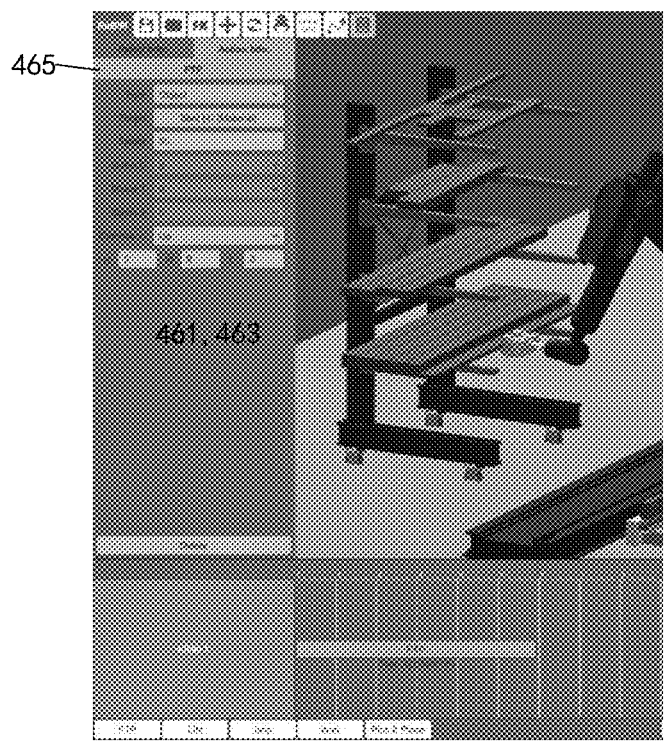
FIG. 15 is a schematic diagram illustrating a PTP setup dropdown menu in the detailed info table for current motion included and shown within the robot control toolbar in accordance with the present invention.

FIG. 15 is a schematic diagram illustrating a PTP setup dropdown menu in the detailed info table for current motion included and shown within the robot control toolbar in accordance with the present invention. The detailed info table 461 further contains a robot action info sheet 463 which further contains a PTP setup dropdown menu 465 for a user to further configure the motion mode by which the end effector moves to the object. The PTP refers to a point-to-point motion which is the most efficient way by which the end effector moves to a specific object.

Figure 16:
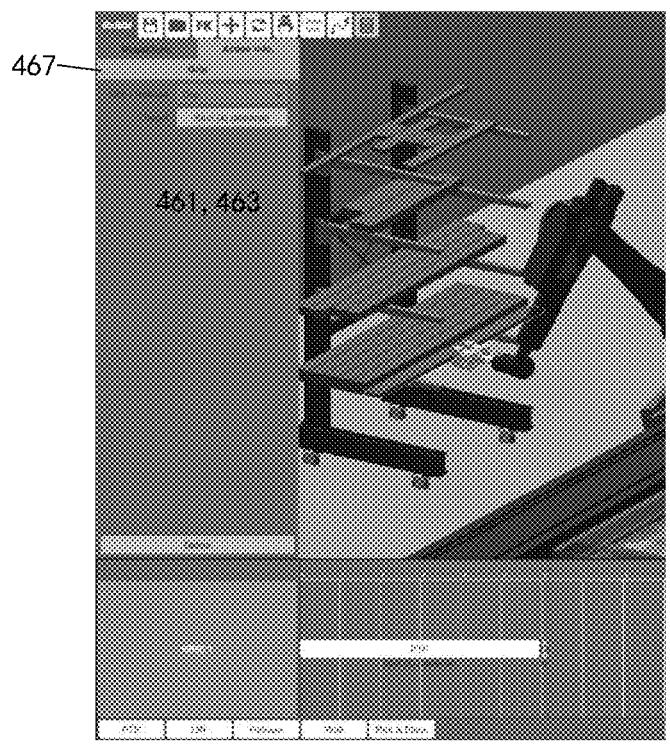
FIG. 16 is a schematic diagram illustrating a GRIP action setup dropdown menu in the detailed info table for current motion included and shown within the robot control toolbar in accordance with the present invention.

FIG. 16 is a schematic diagram illustrating a GRIP action setup dropdown menu in the detailed info table for current motion included and shown within the robot control toolbar in accordance with the present invention. The detailed info table 461 further contains a robot action info sheet 463 which further contains a GRIP action setup dropdown menu 467 for a user to further configure the grip mode for the end effector to grip a specific object.

Visual Programming Panel

Figure 17:
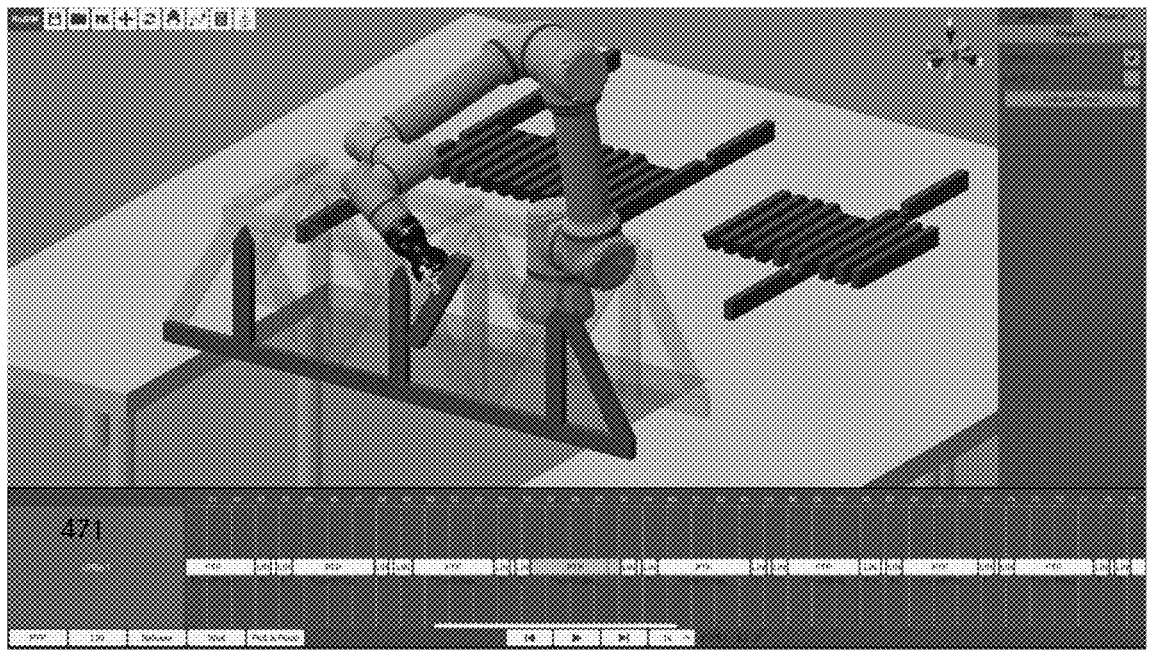
FIG. 17 is a schematic diagram illustrating an example visual programming panel embedded in the visualization interface according to the present invention.

FIG. 17 is a schematic diagram illustrating an example visual programming panel embedded in the visualization interface according to the present invention. The platform 200 further includes a visual programming panel for any user to program and configure robotic motions performing in the simulator graphically and visually. In some embodiments, the visual programming panel 471 is preferably a horizontal toolbar and to be positioned for example at the lower part within visualization interface 469.

The visual programming panel graphically shows a variety of blocks with different lengths that are sequenced and arranged upon a timeline editor. Each of the variety of blocks represent different predefined robotic motions respectively. By utilizing the visual programming panel, any users are allowed to program and configure robotic motions simply by dragging and dropping the blocks into the timeline editor, rather than writing codes. The blocks are also referred to as and replaceable by graphical or iconic elements or boxes.

Robot Motion Simulator

The robot motion planning module enables a robot motion simulation mode by enabling a robot motion simulator that is a built-in physics engine enabling virtual robot objects to simulate or approximate universal forces existing in the real world, such as gravity, velocity, acceleration, friction, etc. Once the sequence of objects and all details for robotic motions in the robot motion simulator are determined, the robot motion planning module switches to and enters into the robot motion simulation mode to simulate the motions of the robotic device, by the given conditions.

In the robot motion simulation mode, for instance, the robot motion planning module may selectively call and execute an intelligent pick and place action algorithm component, to automatically compute and generate a particular pick and place action including at least computing the pick-up point and the place point, defining the moving speed and the motion path, and determining the pressure applied to a particular material to avoid damaging the material, for one robotic device to move a specific wood stud from the material feeder to the workbench, in response to a user's operation in the visualization interface. The material feeder is a roller conveyor receiving a wood raw material pre-manufactured by a computer numerical control (CNC) machine and transporting it to the robotic device. The workbench is tilted by specifying a particular angle in order to cancel a part of gravity.

In subject to the demands, the robot motion planning module may selectively call and execute an intelligent robot path optimization algorithm component, to automatically compute an optimization motion path for the robotic device to follow, in response to a user's operation in the visualization interface. Preferably, the robot motion planning module may selectively call and execute an intelligent collision auto-avoidance algorithm component, to perform a collision-check and detect any possible collision with object material to find out a collision-free path for the robotic device to follow, in response to a user's operation in the visualization interface.

Figure 18:
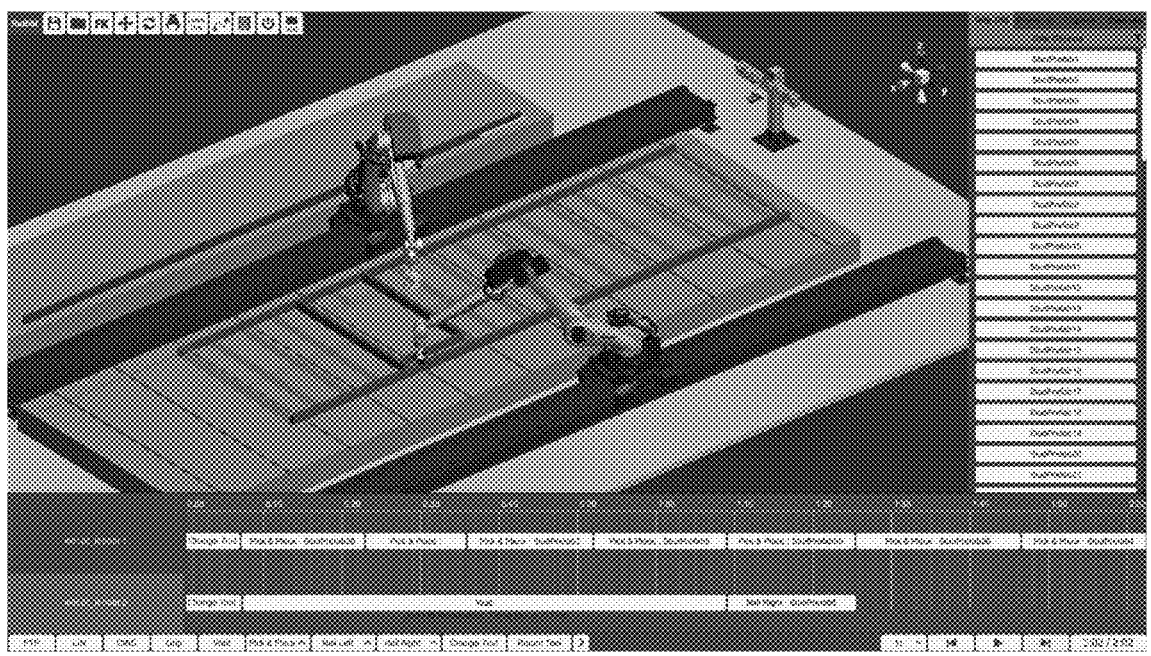
FIG. 18 is a schematic diagram illustrating a scenario that multiple robotic devices harmonically work together simultaneously according to the present invention.

FIG. 18 is a schematic diagram illustrating a scenario that multiple robotic devices harmonically work together simultaneously according to the present invention. In addition, the robot motion planning module may selectively call and execute an intelligent multi-robot motion coordination algorithm component, to coordinate and generate sequences of motions for multiple robotic devices working together within a single timeframe. As shown in FIG. 18, a user is planning, sequencing, scheduling and coordinating motions and sequences of motions for multiple robotic devices within the robot motion scheduling visualization interface 449.

Constructability Tester

Once the user accomplishes all of the configurations in the work cell, a constructability tester that is to check out the constructability for the configurations in the virtual environment is triggered and enabled by clicking a toggle or a trigger button embedded within, for example, the hardware in library sidebar or the robot control toolbar. In response to the user's operation, an intelligent constructability test algorithm component is performed, so as to automatically check out and verify the constructability with the built-in physics engine.

Robot Controller

The platform 200 is an easy-to-use robotic programming tool and provides a simulation to real (sim-to-real) virtual reality environment for any user to use. Any user may coordinate, sequence, schedule, plan, re-plan, modify, and simulate any robot motion in construction, in particular an off-site construction or a near-site construction to prefabricate a construction component, repetitively by operating the platform 200 online.

The platform 200 concludes results of the computer-assisted planning and simulation of robot motions established and determined by a user by generating a predetermined motion command set that includes the determined robot motion path and sequence of motions for a robotic device to move accordingly.

This predetermined motion command set may be streamed out to the robot controllers of one or more external robotic devices to control the robotic devices to act accordingly, in particular to perform a prefabrication task prefabricating a plurality of construction components in a near-site or off-site robotic construction.

Cloud Based Computer-Implemented Method

Figure 19:
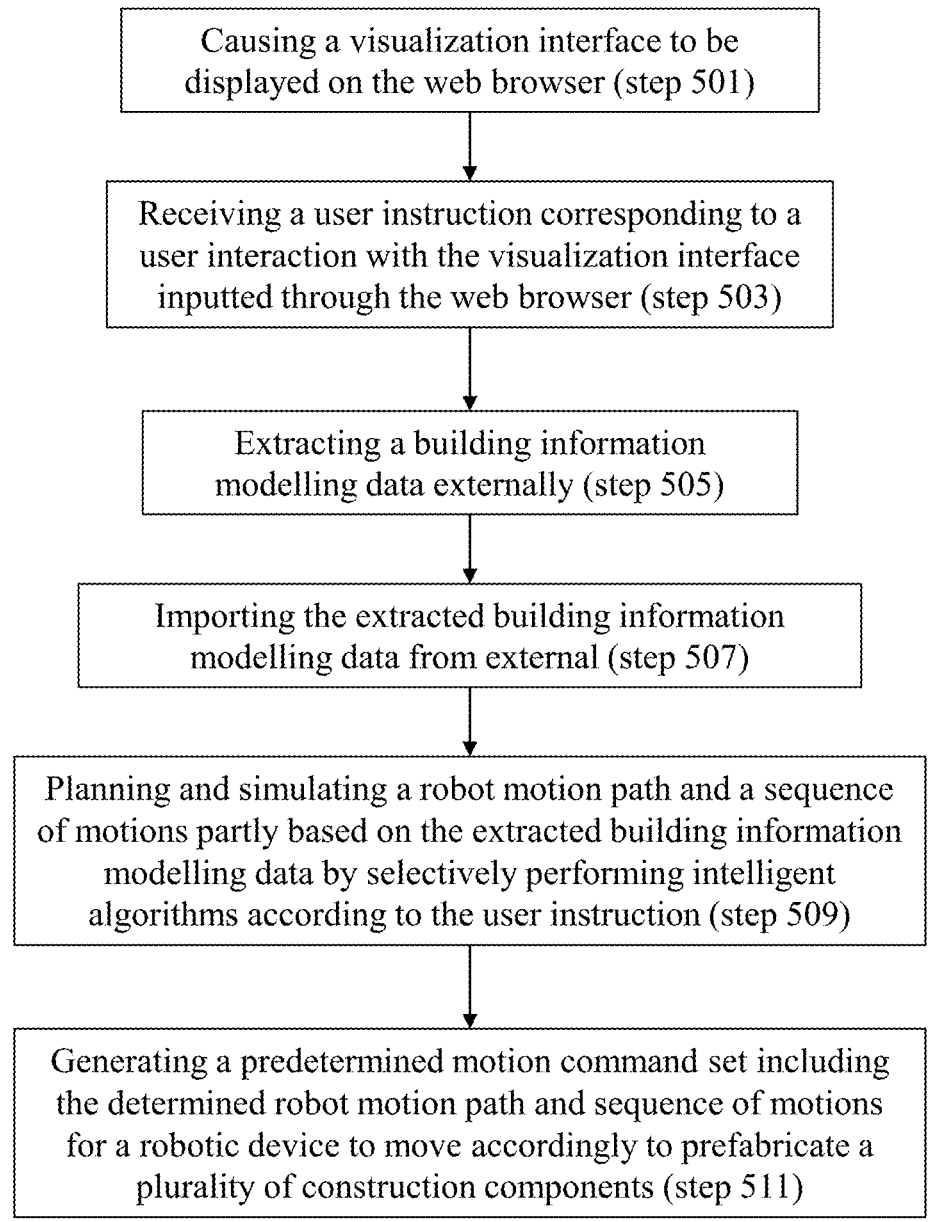
FIG. 19 is a flow chart illustrating the cloud based computer-implemented method for computer-assisted planning and simulation of robot motions in construction according to the present invention.

FIG. 19 is a flow chart illustrating the cloud based computer-implemented method for computer-assisted planning and simulation of robot motions in construction according to the present invention. To sum up, the computer-implemented method 500 for computer-assisted planning and simulation of robot motions in construction in accordance with the present invention preferably includes the following steps: causing a visualization interface to be displayed on the web browser (step 501); receiving a user instruction corresponding to a user interaction with the visualization interface inputted through the web browser (step 503); extracting a building information modelling data externally (step 505); importing the extracted building information modelling data from external (step 507); planning and simulating a robot motion path and a sequence of motions partly based on the extracted building information modelling data by selectively performing intelligent algorithms according to the user instruction (step 509); and generating a predetermined motion command set including the determined robot motion path and sequence of motions for a robotic device to move accordingly to prefabricate a plurality of construction components (step 511).

The contents in section of written descriptions of the invention disclosed in U.S. Provisional Application No. 63/007,033, filed on Apr. 8, 2020, now pending, is fully incorporated by reference as follow.

The present invention relates to a building information modelling (BIM) data extracting method and system that is capable of extracting geometrical information from BIM software, e.g.: Revit, SketchUp, etc., as the input data to feed the other module, in particular, a robot simulator module. The method and system also provides APIs in RESTful API format for most commonly-used BIM software.

BIM digitalizes the design process and create an environment to automate construction processes. The method and system is to subsect the entire building into components, extract the geometrical information and generate the robot-manufacturable models of the building component. The method and system extracts information from BIM models and breaks down the building components for assembly layout within the considerations of robot capacity and building regulations.

The proposed method includes following steps of: receiving BIM data in a format, such as, open BIM standard format with IFC schema, wherein the BIM data includes multiple conditions, such as: size, location, material, schedule, layout and etc.; sending the conditions to simulator, and log the process in database; creating BIM elements that easily to use for robot; linking the Robot Process with exist BIM objects; and starting from Wall with timber structure, replace manual work one by one.

Further to the above, the method and module includes features as follows: the BIM model import and viewing, the building components breakdown, and the geometric information extraction.

The contents in section of written descriptions of the invention disclosed in U.S. Provisional Application No. 63/007,128, filed on Apr. 8, 2020, now pending, is fully incorporated by reference as follow.

The present invention relates to a cloud-computation based robotic simulator that enables the prefabricated home builder to simulate, program, and control the industrial robots. It provides a virtual design and validation environment for linking the building information modelling (BIM) model with the robot control. It allows the builder to simulate and control the robot with an animation-based tool, rather than writing codes. The present simulator links BIM design, robot motion planning results and robot control scripts through a cloud server. Complex motion calculations are conducted via cloud-based computation power.

The present simulator is a cloud-based offline robot programming tool that adds more possibilities to robot planning without complexity. No complicated installation processes—just open your browser. It has a cloud-based database that allows users to access, plan and simulate robot motions anytime, anywhere. It provides for user to simulate multi-robots with an easy-operating visual programming interface. One can program a UR robot frame by frame through an animation-based timeline and spend more time focusing on design and planning rather than coding. Furthermore, the present simulator provides a holistic solution for bridging gap between the digital design of a modular home with the robot controls, and provides APIs of most common BIM tool for extracting the geometrical information for the robotic construction.

The present simulator extracts information from BIM models and breaks down the building components for assembly layout within the considerations of robot capacity and building regulations, and provides an animation-based programming interface which allows the user to program the robot motions without learning and typing lines of code. It has a built-in physics engine with virtual gravity to test the constructibility in the virtual environment, and a coding or programming free software suitable for ordinary users who are not familiar with a skill of or do not like coding or programming.

The present simulator reduces the learning threshold of robot programming. Most engineers can learn and control the basic robot operations within one hour, and is able to be widely applied to various fields of architecture, engineering, and construction. It consists of four major software modules based on the SAAS (software as a service), the PAAS (platform as a service) and the cloud computation technologies, and accessible and operable through any internet browser by users from a remote end. The four major modules are a building information modeling (BIM) extractor module, an assembly planner module, a robot simulator module, and a motion planner module.

The contents in section of written descriptions of the invention disclosed in U.S. Provisional Application No. 63/007,026, filed on Apr. 8, 2020, now pending, is fully incorporated by reference as follow.

The present invention relates to an artificial intelligent (AI) involved in method and module used for autonomously planning and controlling motions of multiple robots. The module includes the artificial intelligence algorithm, such as but not limited to, the A* search algorithm. When there are multiple robots collaborating together, the AI algorithm automatically breaks down the robot trajectories into discrete motions that consider both constraints of surroundings and the limitations of the robots, and identifies the assembly sequence of building components and finding or generating collision-free paths and optimal paths on if required for robots. The output of the motion planner can be connected to the controller of major industrial robots.

The A* search algorithm is a graph traversal and path search algorithm, which is often used in computer science due to its completeness, optimality, and optimal efficiency. It is an informed search algorithm, or a best-first search, meaning that it is formulated in terms of weighted graphs: starting from a specific starting node of a graph, it aims to find a path to the given goal node having the smallest cost (least distance travelled, shortest time, etc.). It does this by maintaining a tree of paths originating at the start node and extending those paths one edge at a time until its termination criterion is satisfied. In actual travel-routing systems, it is generally outperformed by algorithms which can pre-process the graph to attain better performance, as well as memory-bounded approaches; however, the A* search algorithm is still the best solution in many cases.

The method and module can be applied to an action block, such as the Pick & Place block, used in a visual panel configured in a robot simulator, as the action control logic program, to plan and generate the collision-free paths and optimal paths for the Pick & Place action. In addition to the A* search algorithm, the trainable method applied as well to enhance and realize the robot reinforcement learning.

Further to the above, the method and module includes features as follows: the optimized arrangement of dynamic supports, the precise motion planning for structural element transportation, and the assembly failure detection.

There are further embodiments provided as follows.

Embodiment 1: A computer-implemented system includes: an internet capable device installed with a web browser to enable web browsing to access an internet; and a cloud computing server system available on the internet and configured to: cause a visualization interface to be displayed on the web browser; receive a user instruction corresponding to a user interaction with the visualization interface inputted through the web browser; import an extracted building information modelling data from external; plan and simulate a robot motion path and a sequence of motions partly based on the extracted building information modelling data by selectively performing intelligent algorithms according to the user instruction; and generate a predetermined motion command set including the determined robot motion path and sequence of motions for a robotic device to move accordingly to prefabricate a plurality of construction components.

Embodiment 2: The computer-implemented system as described in Embodiment 1 further includes one of following elements: a computer-assisted cloud based robotic construction software platform installed on the cloud computing server system and configured to provide the visualization interface for a user to operate through the web browser, in response to the user instruction, wherein the computer-assisted cloud based robotic construction software platform is established based on the software as a service (SAAS) technology and the platform as a service (PAAS) technology; and the internet capable device providing and running the web browser for the user to operate to access the computer-assisted cloud based robotic construction software platform on the cloud computing server system remotely through the visualization interface to create the predetermined motion command set.

Embodiment 3: The computer-implemented system as described in Embodiment 2, the computer-assisted cloud based robotic construction software platform is further configured to include and perform one of following computer codes: a computer code of an externally-operated building information modelling data breakdown module configured to break down a building information modelling data into a plurality of construction components; a computer code of an externally-operated building information modelling data extraction module configured to extract a building information modelling data to acquire a required information; a computer code of a scene selection module configured to select a scene that is previously made; a computer code of an environment setup module configured to create a new scene from scratch; a computer code of a robot motion planning module configured to plan, sequence, schedule, re-plan, re-sequence, or re-schedule a plurality of robot motions for the robotic device; a computer code of a robot motion simulator configured to provide a built-in physics engine that enables an approximate simulation of physical system in the real world for the planned plurality of robot motions; a computer code of a constructability tester configured to verify a constructability for the planned plurality of robot motions; a computer code of an intelligent breakdown algorithm component configured to automatically break down the building information modelling data into the plurality of construction components; a computer code of an intelligent building information modelling data extraction algorithm component configured to automatically extract a building information modelling data to acquire a required information; a computer code of an intelligent object assembly sequence algorithm component being a rule-based algorithm and configured to automatically sort and put a plurality of basic members in a sequence to assemble the construction component; a computer code of an intelligent robot path optimization algorithm component configured to automatically compute an optimization motion path for the robotic device to follow; a computer code of an intelligent pick and place action algorithm component configured to automatically generate a pick and place action for the robotic device to act accordingly; a computer code of an intelligent collision auto-avoidance algorithm component configured to automatically perform a collision-check and detect any possible collision to find out a collision-free path for the robotic device to follow; a computer code of an intelligent multi-robot motion coordination algorithm component configured to coordinate and generate sequences of motions for multiple robotic devices working together within a single timeframe; and a computer code of an intelligent constructability test algorithm component configured to automatically verify a constructability for the planned plurality of robot motions.

Embodiment 4: The computer-implemented system as described in Embodiment 1, the internet capable device is selected from one of a personal computer, a notebook computer, a tablet device, a mobile device, and a smart phone.

Embodiment 5: The computer-implemented system as described in Embodiment 1, the plurality of construction components is the essential elements used to build up a building that is constructed by implementing civil engineering based construction works and selected from one of a house, a wooden house, a reinforced concrete building, a steel building, a steel-reinforced concrete building, a residential complex, an apartment complex, a ondominium, a dwelling unit, a skyscraper, and a combination thereof.

Embodiment 6: A computer-implemented method includes steps of: causing a visualization interface to be displayed on the web browser; receiving a user instruction corresponding to a user interaction with the visualization interface inputted through the web browser; extracting a building information modelling data externally; importing the extracted building information modelling data from external; planning and simulating a robot motion path and a sequence of motions partly based on the extracted building information modelling data by selectively performing intelligent algorithms according to the user instruction; and generating a predetermined motion command set including the determined robot motion path and sequence of motions for a robotic device to move accordingly to prefabricate a plurality of construction components.

Embodiment 7: The computer-implemented method as described in Embodiment 6 further includes one of following steps: providing an internet capable device installed with a web browser to enable web browsing to access an internet; providing a computer-assisted cloud based robotic construction software platform that is available on the internet; configuring the computer-assisted cloud based robotic construction software platform to: causing the visualization interface to be displayed on the web browser; receiving the user instruction corresponding to the user interaction with the visualization interface inputted through the web browser; extracting the building information modelling data externally; importing the extracted building information modelling data from external; planning and simulating the robot motion path and the sequence of motions partly based on the extracted building information modelling data by selectively performing intelligent algorithms according to the user instruction; and generating the predetermined motion command set including the determined robot motion path and sequence of motions for the robotic device to move accordingly to prefabricate a plurality of construction components.

Embodiment 8: The computer-implemented method as described in Embodiment 7 further includes: configuring the computer-assisted cloud based robotic construction software platform to execute one of following steps: performing a computer code of an externally-operated building information modelling data breakdown module configured to break down a building information modelling data into a plurality of construction components; performing a computer code of an externally-operated building information modelling data extraction module configured to extract a building information modelling data to acquire a required information; performing a computer code of a scene selection module configured to select a scene that is previously made; performing a computer code of an environment setup module configured to create a new scene from scratch; performing a computer code of a robot motion planning module configured to plan, sequence, schedule, re-plan, re-sequence, or re-schedule a plurality of robot motions for the robotic device; performing a computer code of a robot motion simulator configured to provide a built-in physics engine that enables an approximate simulation of physical system in the real world for the planned plurality of robot motions;

performing a computer code of a constructability tester configured to verify a constructability for the planned plurality of robot motions; performing a computer code of an intelligent breakdown algorithm component configured to automatically break down the building information modelling data into the plurality of construction components; performing a computer code of an intelligent building information modelling data extraction algorithm component configured to automatically extract a building information modelling data to acquire a required information; performing a computer code of an intelligent object assembly sequence algorithm component being a rule-based algorithm and configured to automatically sort and put a plurality of basic members in a sequence to assemble the construction component; performing a computer code of an intelligent robot path optimization algorithm component configured to automatically compute an optimization motion path for the robotic device to follow; performing a computer code of an intelligent pick and place action algorithm component configured to automatically generate a pick and place action for the robotic device to act accordingly; performing a computer code of an intelligent collision auto-avoidance algorithm component configured to automatically perform a collision-check and detect any possible collision to find out a collision-free path for the robotic device to follow; performing a computer code of an intelligent multi-robot motion coordination algorithm component configured to coordinate and generate sequences of motions for multiple robotic devices working together within a single timeframe; and performing a computer code of an intelligent constructability test algorithm component configured to automatically verify a constructability for the planned plurality of robot motions.

Embodiment 9: The computer-implemented method as described in Embodiment 6 further includes one of following steps: performing a computer code of an externally-operated building information modelling data breakdown module configured to break down a building information modelling data into a plurality of construction components; performing a computer code of an externally-operated building information modelling data extraction module configured to extract a building information modelling data to acquire a required information; performing a computer code of a scene selection module configured to select a scene that is previously made; performing a computer code of an environment setup module configured to create a new scene from scratch; performing a computer code of a robot motion planning module configured to plan, sequence, schedule, re-plan, re-sequence, or re-schedule a plurality of robot motions for the robotic device; performing a computer code of a robot motion simulator configured to provide a built-in physics engine that enables an approximate simulation of physical system in the real world for the planned plurality of robot motions; and performing a computer code of a constructability tester configured to verify a constructability for the planned plurality of robot motions.

Embodiment 10: The computer-implemented method as described in Embodiment 6 further includes one of following steps: performing a computer code of an intelligent breakdown algorithm component configured to automatically break down the building information modelling data into the plurality of construction components; performing a computer code of an intelligent building information modelling data extraction algorithm component configured to automatically extract a building information modelling data to acquire a required information; performing a computer code of an intelligent object assembly sequence algorithm component being a rule-based algorithm and configured to automatically sort and put a plurality of basic members in a sequence to assemble the construction component; performing a computer code of an intelligent robot path optimization algorithm component configured to automatically compute an optimization motion path for the robotic device to follow; performing a computer code of an intelligent pick and place action algorithm component configured to automatically generate a pick and place action for the robotic device to act accordingly; performing a computer code of an intelligent collision auto-avoidance algorithm component configured to automatically perform a collision-check and detect any possible collision to find out a collision-free path for the robotic device to follow; performing a computer code of an intelligent multi-robot motion coordination algorithm component configured to coordinate and generate sequences of motions for multiple robotic devices working together within a single timeframe; and performing a computer code of an intelligent constructability test algorithm component configured to automatically verify a constructability for the planned plurality of robot motions.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:
1. A computer-implemented system comprising:
an internet capable device installed with a web browser to enable web browsing to access an internet; and
a cloud computing server system available on the internet and configured to:
provide a computer-assisted cloud based robotic construction software platform that integrates and comprises an externally-operated building information modelling data breakdown module, an externally-operated building information modelling data extraction module, a scene selection module, an environment setup module, a robot motion planning module, a robot motion simulator, a constructability tester module, an intelligent breakdown algorithm module, an intelligent building information modelling data extraction algorithm module, an intelligent object assembly sequence algorithm module, an intelligent robot path optimization algorithm module, an intelligent pick and place action algorithm module, an intelligent collision auto-avoidance algorithm module, an intelligent multi-robot motion coordination algorithm module, and an intelligent constructability test algorithm module for a user to select and operate, so as to enable a comprehensive online cloud computation based computer-assisted virtual planning, simulation, and demonstration for a virtual robotic device corresponding to a robotic device that performs robot motions in reality to prefabricate a plurality of construction components in an off-site robotic semi-automation construction in accordance with actual construction information conditions in reality in the off-site robotic semi-automation construction;

provide a visualization interface comprising a visual programming panel comprising a timeline editor associated to the robotic device for a visual programming, and a variety of motion blocks, each of which the variety of motion blocks is programmed to represent and enable a predefined robotic motion performed by the robotic device;

at the timeline editor, provide for the user to manually select a plurality of motion blocks out of from the variety of motion blocks to form a combination of motions and to add the plurality of motion blocks into the timeline editor to arrange and determine a spatial arrangement of the plurality of motion blocks, wherein an order of the spatial arrangement of the plurality of motion blocks in the timeline editor is a temporal sequence of performance in which the robotic device performs the plurality of motion blocks;

receive a user instruction corresponding to a user interaction with the visualization interface inputted through the web browser;

import an extracted building information modelling data from external;

execute an intelligent collision auto-avoidance algorithm component configured to automatically perform a collision-check process for the combination of motions defined by the plurality of motion blocks to detect any possible collision to automatically plan a collision-free path as a robot motion path for the robotic device to follow based on the determined temporal sequence of performance of the plurality of motion blocks in the timeline editor and the extracted building information modelling data;

simulate and display the robot motion path based on the determined temporal sequence of performance of the plurality of motion blocks in the timeline editor for the user to view and check; and generate a predetermined motion command set based on the robot motion path and the determined temporal sequence of performance of the plurality of motion blocks for the robotic device to move accordingly to prefabricate the plurality of construction components.

2. The computer-implemented system as claimed in claim 1, further comprising one of following elements:

the computer-assisted cloud based robotic construction software platform installed on the cloud computing server system and configured to provide the visualization interface for theft user to operate through the web browser, in response to the user instruction, wherein the computer-assisted cloud based robotic construction software platform is established based on the software as a service (SAAS) technology and the platform as a service (PAAS) technology; and the internet capable device providing and running the web browser for the user to operate to access the computer-assisted cloud based robotic construction software platform on the cloud computing server system remotely through the visualization interface to create the predetermined motion command set.

3. The computer-implemented system as claimed in claim 2, wherein the computer-assisted cloud based robotic construction software platform is further configured to comprise and perform one of following computer codes:

a computer code of the externally-operated building information modelling data breakdown module configured to break down a building information modelling data into the plurality of construction components;

a computer code of the externally-operated building information modelling data extraction module configured to extract a building information modelling data to acquire a required information;

a computer code of the scene selection module configured to select a scene that is previously made;

a computer code of the environment setup module configured to create a new scene from scratch;

a computer code of the robot motion planning module configured to plan, sequence, schedule, re-plan, re-sequence, or re-schedule a plurality of robot motions for the robotic device;

a computer code of the robot motion simulator configured to provide a built-in physics engine that enables an approximate simulation of physical system in the real world for the planned plurality of robot motions;

a computer code of the constructability tester module configured to verify a constructability for the planned plurality of robot motions;

a computer code of the intelligent breakdown algorithm module configured to automatically break down the building information modelling data into the plurality of construction components;

a computer code of the intelligent building information modelling data extraction algorithm module configured to automatically extract a building information modelling data to acquire a required information;

a computer code of the intelligent object assembly sequence algorithm module being a rule-based algorithm and configured to automatically sort and put a plurality of basic members in a sequence to assemble the plurality of construction component;

a computer code of the intelligent robot path optimization algorithm module configured to automatically compute an optimization motion path for the robotic device to follow;

a computer code of the intelligent pick and place action algorithm module configured to automatically generate a pick and place action for the robotic device to act accordingly;

a computer code of the intelligent collision auto-avoidance algorithm module configured to automatically perform the collision-check and detect any possible collision to find out the collision-free path for the robotic device to follow;

a computer code of the intelligent multi-robot motion coordination algorithm module configured to coordinate and generate sequences of motions for multiple robotic devices working together within a single timeframe; and a computer code of the intelligent constructability test algorithm module configured to automatically verify a constructability for the planned plurality of robot motions.

4. The computer-implemented system as claimed in claim 1, wherein the internet capable device is selected from one of a personal computer, a notebook computer, a tablet device, a mobile device, and a smart phone.

5. The computer-implemented system as claimed in claim 1, wherein the plurality of construction components are used to build up a building that is constructed by implementing civil engineering based construction works and selected from one of a house, a wooden house, a reinforced concrete building, a steel building, a steel-reinforced concrete building, a residential complex, an apartment complex, a condominium, a dwelling unit, a skyscraper, and a combination thereof.

\* \* \* \* \*